March 13, 1934.　　　　C. A. DIX　　　　1,951,275
METAL RE-SHAPING MACHINE
Filed Aug. 19, 1932　　　3 Sheets-Sheet 1
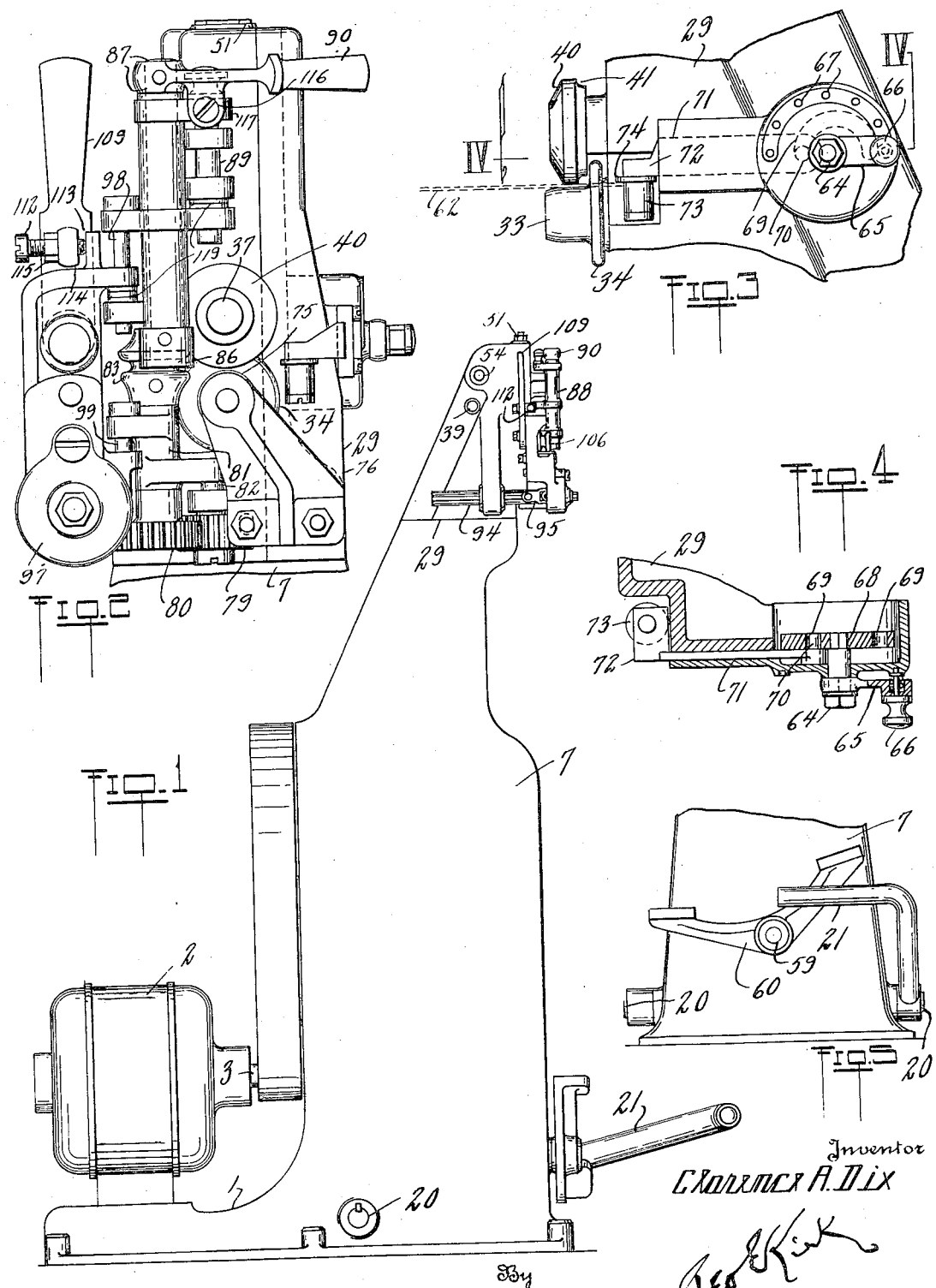

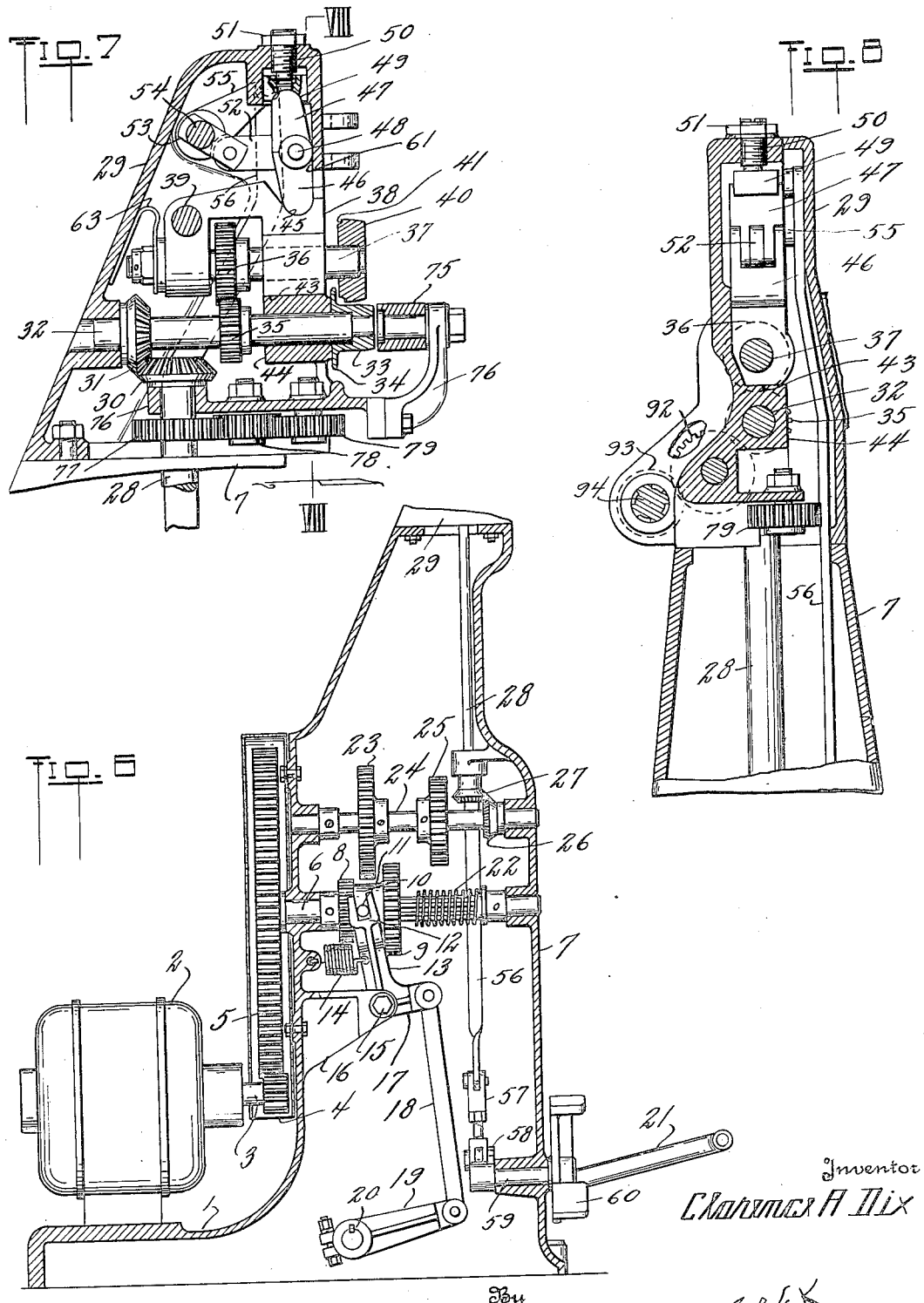

March 13, 1934.  C. A. DIX  1,951,275
METAL RE-SHAPING MACHINE
Filed Aug. 19, 1932   3 Sheets-Sheet 3
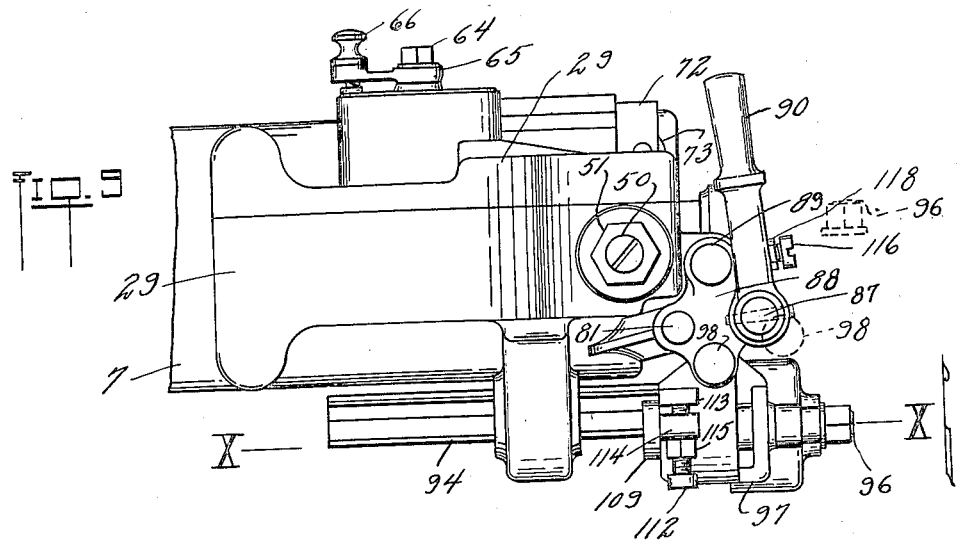
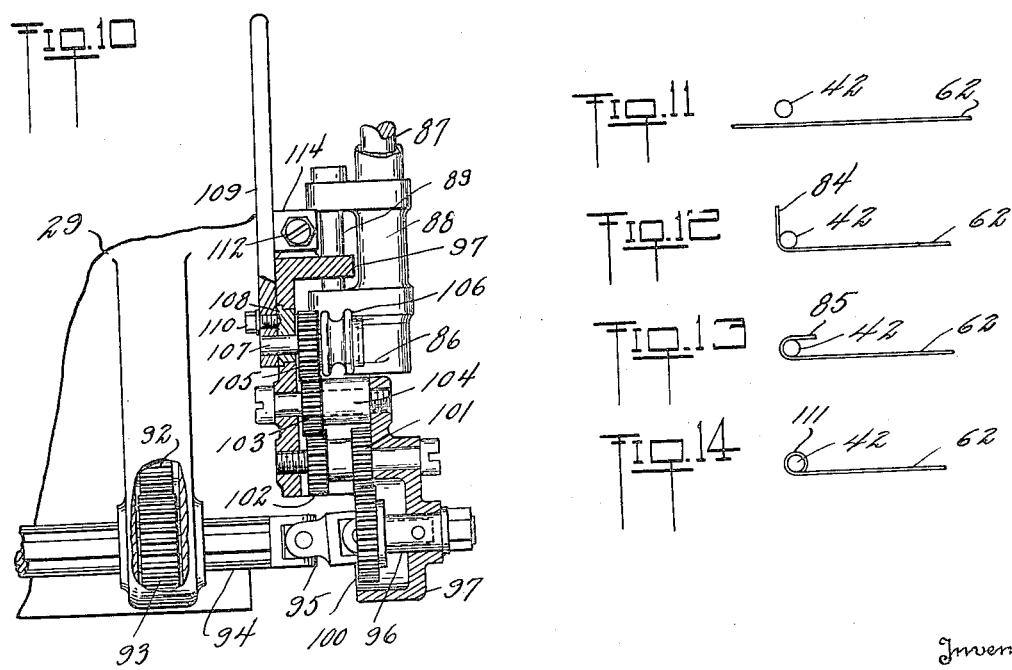

Patented Mar. 13, 1934

1,951,275

UNITED STATES PATENT OFFICE 1,951,275

METAL RESHAPING MACHINE

Clarence A. Dix, Detroit, Mich.

Application August 19, 1932, Serial No. 629,436

11 Claims. (Cl. 153—59)

This invention relates to reforming an edge portion of sheet metal.

This invention has utility when incorporated in power drive forming elements and coacting drive means for directing and confining the progress of the material as in forming a bead thereon.

Referring to the drawings:

Fig 1 is a side view of an embodiment of the invention in a beading machine for sheet metal;

Fig. 2 is a view of the working head from the opposite side of the showing of Fig. 1;

Fig. 3 is a fragmentary detail from the right of Fig. 2;

Fig. 4 is a section on the line IV—IV, Fig. 3;

Fig. 5 is a view of a portion of the base of the pedestal from the right of Fig. 1;

Fig. 6 is a view in section, showing the transmission in the pedestal;

Fig. 7 is a sectional view of the working head in the plane of the first roller pair;

Fig. 8 is a section on the line VIII—VIII, Fig. 7;

Fig. 9 is a plan view of the working head;

Fig. 10 is a section on the line X—X, Fig. 9;

Fig. 11 shows a view of the relation of the parts say for wiring-in operation before assembled;

Fig. 12 is a first view of the assembly with the sheet metal given the angular position;

Fig. 13 shows the action of the second shaping operation for the forming of the L to a U; and Fig. 14 shows the completion of the bead as effected at the third roller pair.

Base 1 is shown mounting motor 2 having shaft 3 provided with pinion 4 in mesh with gear 5 on shaft 6 in pedestal 7 parallel to the shaft 3. This pedestal 7, as rising from the base 1, houses the general drive or transmission. Splined on the shaft 6 are gears 8, 9, connected by collar 10 having pins 11 engaged by forks 12 of angle lever having upstanding arm 13 normally retracted by spring 14 to hold the gears 8, 9, out of transmission relation. This angle lever arm 13 is mounted on fixed fulcrum 15 in bracket 16 carried in the pedestal 7. From this fulcrum bearing 15 there extends short arm 17 of the angle lever 13, 17. From this short arm there depends link 18 to arm 19 on rock shaft 20 having bearing in the base 1 and from which extends treadle 21. As the machine operator depresses the pedal 21, such may shift, against the resistance of compression spring 22 on the shaft 6, the collar 10 to bring the gear 8 into mesh with gear 23 for a low speed driving of shaft 24 in the pedestal 7 parallel to and above the shaft 6. Further depression of the pedal 21 will throw the gear 8 clear of the gear 23 and bring the gear 9 into mesh with gear 25 for a second or higher rotation speed of the driven shaft 24 in the transmission.

Fast on this shaft 24 is pinion 26 in mesh with beveled pinion 27 upon vertical shaft 28 which extends from the pedestal 7 into head 29 (Fig. 7) and there has pinion 30 in mesh with beveled pinion 31 on shaft 32 having fixed thereon roll 33 having flange 34. This shaft 32 additionally carries pinion 35 in mesh with pinion 36 on shaft 37 mounted in bracket 38 on fixed pivot 39 in the housing or head 29.

This shaft 37 as protruding from the bracket 38 carries roll 40 having seat 41 which in wiring-in operations may serve as a guide for wire 42. There is accordingly, at this stage, a first live roll pair 33, 34, 40, 41. The roll 33, 34, is on fixed axis with its shaft 32. The roll 40, 41, is normally held in fixed position with bracket 38, seat portion 43, toward abutting bearing 44 in the head 29. This fixed position for this bracket 38 in holding the upper roll 40, 41, is controlled. The bracket 38 has seat 45 in which is link 46 of toggle having upper link 47 pivotally connected to the link 46 by pin 48. Opposing the seat 45 is seat 49 adjusted by threaded bolt 50 in the housing 29. This bolt 50, as threaded in its adjustment with the housing 29, may have its position locked by nut 51.

From the pivot pin 48 there extends link 52 to arm 53 fixed with rock shaft 54. From this rock shaft 54 (Fig. 7) there extends crank arm 55, the free end of which is engaged by depending link 56 having connection by link 57 (Fig. 6) to arm 58 on rock shaft 59 protruding from the pedestal 7, there to carry treadle lever 60. Pressing one of the tread portions of the lever 60 serves to throw the link 52 and the pin 48 toward portion 61 of the head 29 and thereby throw the toggle 46, 47, into locking position beyond dead center in holding the rocking frame on its roller 41 in the adjusted position for clearance as to the roll 33, 34, as determined by the adjusting screw 50. This is in a gripping relation for the desired thickness of stock 62 as used in the machine.

To release the machine for introducing stock or to re-set or perform other operations, it is only necessary for the attendant to rock the lever 60 oppositely, thereby drawing the link 52 away from the portion 61 of the housing, thus breaking the toggle 46, 47, and allowing spring 63 as acting on the shaft 37 to rock this shaft 37 and its frame 38 upon the pin 39 as an axis for clearance between the roll 40, 41, and the roll 33, 34.

Adjustment provision for location of the beading as to its proximity as to the edge of the stock, is cared for herein. The housing 29 (Figs. 3, 4) has bolt 64 carrying arm 65 with spring pin 66 adjustable to be normally thrust into a selected recess 67 in an arc as to the bolt 64. Fixed with this bolt 64 inward from this housing is disk 68 having cam groove 69, with which may coact pin 70 on slide bar 71 terminating in bracket 72, carrying roller 73. It is thus seen that this roller 73 as an abutment may, below its flange 74, receive the edge of the stock 62 at the adjusted position past the flange 34 of the roll 33. At this feeding position for the stock 62 such is anti-frictionally sustained in position adjacent the working drive or roller 33, 34, by supplemental idle roll 75 mounted on bracket 76 (Fig. 7).

The shaft 28, as extending into the head 29, has spaced from the pinion 30 by bracket 76, spur pinion 77 in mesh with intermediate idle pinion 78, transmitting to pinion 79 (Figs. 2, 7). This pinion 79 is in mesh with pinion 80 mounted in hinged bracket 81 carried by hinged pin 82 concentric with the pinion 79.

This pinion 80 has fixed therewith grooved working roll 83 effective for changing the direction of the L or flange 84 (Fig. 12) as formed by the first working roll pair 33, 34, 40, 41, into U 85 (Fig. 13). In this operation, shoe 86 cooperates to hold the work against the grooved roll 83. This shoe 86 is mounted on shaft 87 in bracket 88, carried by hinge pin 89 in alignment with the hinge pin 82. Handle 90, fixed with the steam 87, provides manual means effective for shifting this directing guide 86 in controlling the position of the work as being acted upon by the grooved roller 83.

Drive is provided for the third working pair. It is to be noted that the drives for an element of the first pair and an element of the second working pair are by gearing directly from the transmission. The drive for the third pair is from the drive for the first pair, in that the pinion 35, besides being in mesh with the pinion 36, is also in mesh with intermediate pinion 92 (Fig. 8), in mesh with gear 93 splined on shaft 94. This shaft 94 is provided with universal joint 95 to stub shaft section 96 in auxiliary frame 97 carried by pivot pins 98, 99, in alignment and mounted from the second roll pair brackets 81, 88. The stub shaft 96, as driven by the universal joint 95 from the splined shaft 93, has gear 100 in mesh with pinion 101 in the auxiliary frame 97. This pinion 101 has fast therewith pinion 102 in mesh with pinion 103 fixed with roll member 104. In mesh with this pinion 103 is additional pinion 105 fixed with groove roll 106. There is, accordingly, herein, the positive driving rotary working elements or dies 104, 106, of the third working pair.

The roll 106 and its gear 105 are fixed with each other and loosely mounted on shaft 107 mounted in eccentric 108 in the auxiliary frame 97. This shaft 107 has thereon arm 109 carrying screw 110 adjustable into angular locking engagement with the eccentric 108. Accordingly, by angularly shifting this handle 109, there may be adjustment of the clearance between the working pair 104, 106, and extreme shifting to place the pair in work releasing position. The shifting of the handle 90 also may effect work releasing position as does the shifting of the treadle lever 60. It is accordingly seen that each of the three working pairs may be adjusted or placed in the desired working relation independently of the other.

Furthermore, the driving is positive in a sequence wherein, as independently controlled, an extreme of work in one position does not tend to distort or throw the work out in another or adjacent position. The action of this third roll pair 104, 106, is effective upon the free portion of the U 85 to close such down into bead 111. The position to which this handle 109 is thrown, say for a desired thickness of stock gripping may be determined by adjusting set screw 112, thereby swinging the handle 109 to bring this screw into abutting relation with stop 113. The screw 112 is locked in its adjustment as to its mounting 114 by lock nut 115.

The refinement for limit of throw of the terminal or third pair as determined by the set screw adjustment 112 is a feature which is also incorporated for determining an adjustment for the intermediate working pair as to the position of the shoe 86. To this end, the handle 90 (Figs. 2, 9) has adjustable set screw 116 therein which, at its various set positions may abut stop 117 and be locked in such adjusted position by lock nut 118. It is thus seen that for each of the three working pairs, there is a nicety for stock handling or clearance adjustment at the different pairs by the series of set screws 50, 116, and 112 respectively.

A feature of merit herein is that the hinging of the follower working pairs is in a common plane with the work of the primary pair. That is, the axes of the pins 82, 89, is in the plane of the working for the stock as entering the pair 33, 34, 40, 41. Likewise, in this straight line working, the hinge pins 98, 99, may be in the common plane with the pins 82, 89, as well as in the plane for the straight line operation of work through this first working pair in addition to the intermediate and final or third working pair. This is a feature of cooperative utility in that any departure from straight line operation is readily accommodated without driving strains tending to throw such farther out of line. This elimination of driving strains to throw out of line is a feature to which it is believed there is contribution due to the spur driving or the transmission from the pairs being transversely of the swing adjustments. This accordingly minimizes tendencies to distort by throwing the driving parts out of line.

There is shown clearance on the various hinge pins into which may be introduced washers 119, which may be inserted or removed as desired in taking care of departures from straight line operations in the work. This is a controlled flexibility for insuring continuity of operations for a nicety in production.

What is claimed and it is desired to secure by Letters Patent is:

1. A multi-stage re-working machine embodying a succession of opposing pairs of working elements for acting upon material, and driving means for the elements independent of the material for the progression of the material to be acted upon relatively to said pairs of elements in sequence, said driving means including shiftable gears, reversely movable gear engaging means for effecting different drive connections for the gears, and a one-direction movable actuator for effecting said different driving connections for the engaging means.

2. A multi-stage re-working machine embodying a succession of opposing pairs of working elements for acting upon material, driving means for the elements independent of the material for the progression of the material to be acted upon relatively to said pairs of elements in sequence, said driving means including a variable speed transmission, a controller movable in a common direction from an off position to a plurality of operating speed positions, and rockable connections from the controller reversely operable by movement of said controller.

3. A multi-stage re-working machine embodying a succession of opposing pairs of working elements for acting upon material, driving means for the elements independent of the material for the progression of the material to be acted upon relatively to said pairs of elements in sequence, said driving means including a variable speed transmission, and a pedestal mounting the elements and housing the transmission.

4. A multi-stage re-working machine embodying a succession of opposing pairs of working elements for acting upon material, driving means for the elements independent of the material for the progression of the material to be acted upon relatively to said pairs of elements in sequence, said driving means including a transmission, gearing from the transmission directly to two pairs of the elements, gearing from one of said pairs of elements to an element of the third pair, and a depressible treadle having different speed connection effecting positions for the driving means at different position points of treadle depression for common direction of drive operation for the driving means.

5. A multi-stage re-working machine embodying a succession of opposing pairs of working elements for acting upon material, driving means for the elements independent of the material for the progression of the material to be acted upon relatively to said pairs of elements in sequence, said driving means including a transmission, gearing from the transmission to an element of the first pair and an element of an intermediate pair, and gearing from the first element pair to an element of the third pair independent of transmission connection through said intermediate pair.

6. A multi-stage re-working machine embodying a succession of opposing pairs of working elements for acting upon material, driving means for the elements independent of the material for the progression of the material to be acted upon relatively to said pairs of elements in sequence, said driving means including a transmission, a frame for mounting the transmission, a first pair of said elements being fixed, an additional pair of elements being movable, and gearing from the transmission to an element of the fixed and an element of the movable pair.

7. A multi-stage re-working machine embodying a succession of opposing pairs of working elements for acting upon material, driving means for the elements independent of the material for the progression of the material to be acted upon relatively to said pairs of elements in sequence, said driving means including a transmission, a frame for mounting the transmission, a first pair of said elements being fixed with said frame, an additional pair of elements, a mounting for the additional pair of elements for movements relative to the frame, gearing from the transmission to an element of the fixed and an element of the movable pair, and gearing from the fixed pair to an additional element of the movable pair.

8. A multi-stage re-working machine embodying a succession of opposing pairs of working elements for acting upon material, driving means for the elements independent of the material for the progression of the material to be acted upon relatively to said pairs of elements in sequence, there being hinge mounting means for one pair as to a preceding pair of elements, and second hinge mounting means for a succeeding pair of the working elements, said hinge mounting means having their axes parallel.

9. A multi-stage re-working machine embodying a succession of opposing pairs of working elements for acting upon material, driving means for at least one element of each of the respective pairs for the progression of the material to be acted upon relatively to said pairs of elements in sequence, a hinge mounting for a succeeding working pair, and a second hinge mounting on said succeeding pair for a third working pair of the elements.

10. A multi-stage re-working machine embodying a succession of opposing pairs of working elements for acting upon material, driving means for at least one element of each of the respective pairs for the progression of the material to be acted upon relatively to said pairs of elements in sequence, a hinge mounting for a succeeding working pair, and a second hinge mounting on said succeeding pair for a third working pair of the elements.

11. A multi-stage re-working machine embodying a succession of opposing pairs of working elements for acting upon material, driving means for at least one element of each of the respective pairs for the progression of the material to be acted upon relatively to said pairs of elements in sequence, a hinge mounting for a succeeding working pair, a second hinge mounting on said succeeding pair for a third working pair of the elements, and means for relatively adjusting said pairs axially of said hinge mountings.

CLARENCE A. DIX.

CERTIFICATE OF CORRECTION.

Patent No. 1,951,275. March 13, 1934.

CLARENCE A. DIX.

It is hereby certified that error appears in the printed specification of the above numbered patent requiring correction as follows: Page 3, line 53, claim 6, after the word "fixed" and before the comma insert the words with said frame; line 54, strike out the words "being movable" and insert instead the comma and words , a mounting for the additional pair of elements for movement relatively to the frame; line 85, claim 7, for the word "movements" read movement; and that the said Letters Patent should be read with these corrections therein that the same may conform to the record of the case in the Patent Office.

Signed and sealed this 15th day of May, A. D. 1934.

Bryan M. Battey (Seal) Acting Commissioner of Patents.